(12) United States Patent
Thevoux-Chabuel et al.

(10) Patent No.: US 6,272,444 B1
(45) Date of Patent: Aug. 7, 2001

(54) METHOD FOR CHARACTERIZING THE COHERENCE OF AN ENVIRONMENT CHARACTERISTIC MEASUREMENTS

(75) Inventors: Hugues Thevoux-Chabuel, Pau; Philippe Rabiller, Lescar, both of (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/242,229

(22) PCT Filed: Jun. 11, 1998

(86) PCT No.: PCT/FR98/01209

§ 371 Date: Feb. 11, 1999

§ 102(e) Date: Feb. 11, 1999

(87) PCT Pub. No.: WO98/57198

PCT Pub. Date: Dec. 17, 1998

(30) Foreign Application Priority Data

Jun. 13, 1997 (FR) .................................................. 97 07329

(51) Int. Cl.[7] .............................. G06F 15/00; G01V 11/00
(52) U.S. Cl. ................................ 702/179; 702/6; 702/11; 367/25; 367/26
(58) Field of Search .................................... 702/179, 6–7, 702/11, 14; 706/15, 20, 929; 73/152.02, 152.05, 152.06; 367/33–35, 25–26

(56) References Cited

U.S. PATENT DOCUMENTS

| 4,245,313 | * | 1/1981 | Coates ............................... 73/152.15 |
| 4,320,469 | * | 3/1982 | Frawley et al. ............................. 702/6 |
| 4,338,664 | * | 7/1982 | Mayer ....................................... 702/11 |
| 4,700,300 | * | 10/1987 | Schultz et al. ........................... 367/43 |
| 6,002,985 | * | 12/1999 | Stephenson ............................ 706/929 |

FOREIGN PATENT DOCUMENTS 2215891   9/1989 (GB).

OTHER PUBLICATIONS

P. W. H. Chung, et al., "Handling Uncertainty In Accessing Petroleum Exploration Data", Revue de l'Institut Francais du Petrole, vol. 47, No. 3, May/Jun. 1992, pp. 305–314.

H. Cardon, et al., "A Neural Network Application in Geology: Identification of Genetic Facies", Proceedings 1991 Intern. Conf. on Artif. Neural Networks, Jun. 24–28, 1991, pp. 809–813.

S. G. C. Fraiha, et al., "Factor Analysis of Ambiguity in Geophysics", Geophysics, vol. 59, No. 7, Jul 1994, pp. 1083–1091.

* cited by examiner

Primary Examiner—Marc S. Hoff
Assistant Examiner—Bryan Bui
(74) Attorney, Agent, or Firm—Ostrolenk, Faber, Gerb & Soffen, LLP

(57) ABSTRACT

A method for evaluating the coherence of environmental measurements of a given geological medium or field using well logging data is disclosed. A series of N geological parameters are each measured at a series of reference points found in reference wells within this medium. Each reference point is at a different depth and has known lithological characteristics, and the N measurements form a reference observation (Xi) corresponding to that point. The same N parameters are measured at application points found in one or more application wells, at depths identical to those of the reference points, forming an application observation (x) for each application point. A neighboring domain (Di) and acceptance class are defined for each reference observation (Xi). Each application observation (x) is then compared with all of reference observations (Xi) using a nearest-neighbor algorithm to determine the degree of membership of the application observation in each reference observation's acceptance class. This degree of membership is then used to predict or estimate the lithological characteristics for each application point.

11 Claims, 21 Drawing Sheets

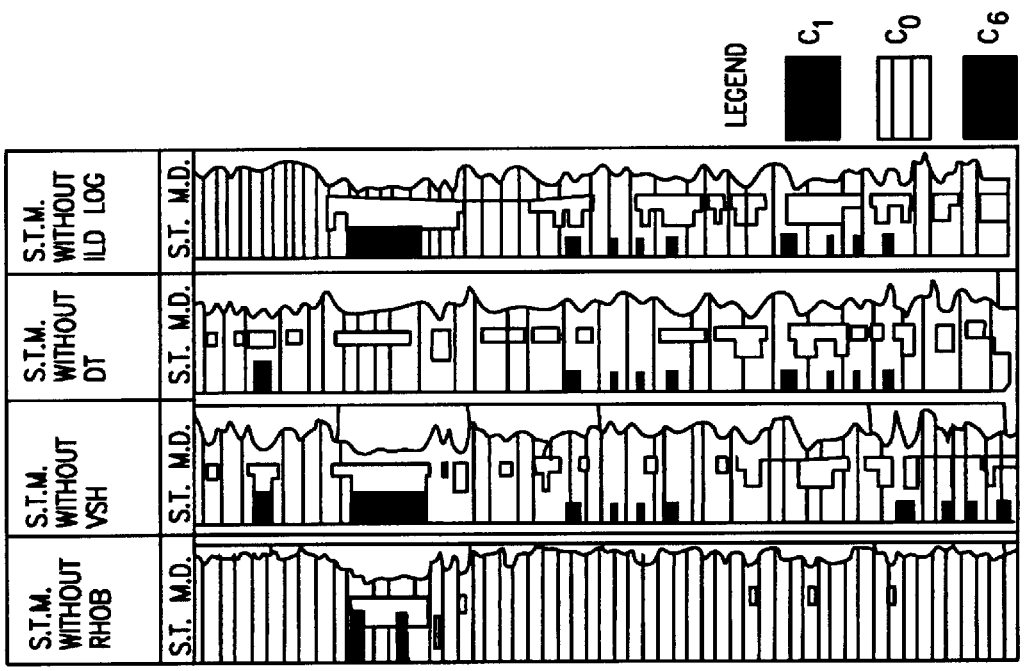
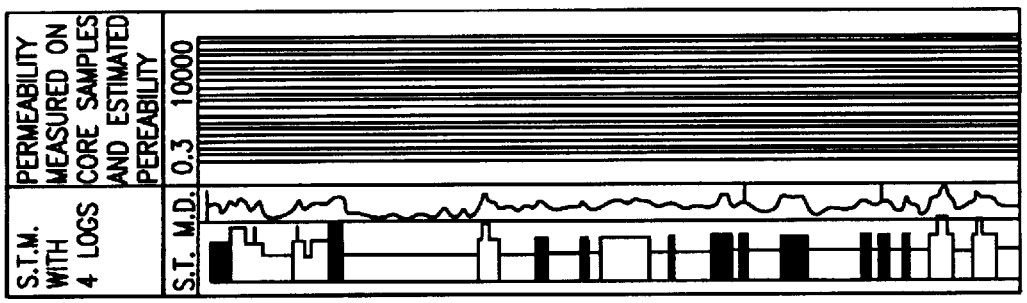
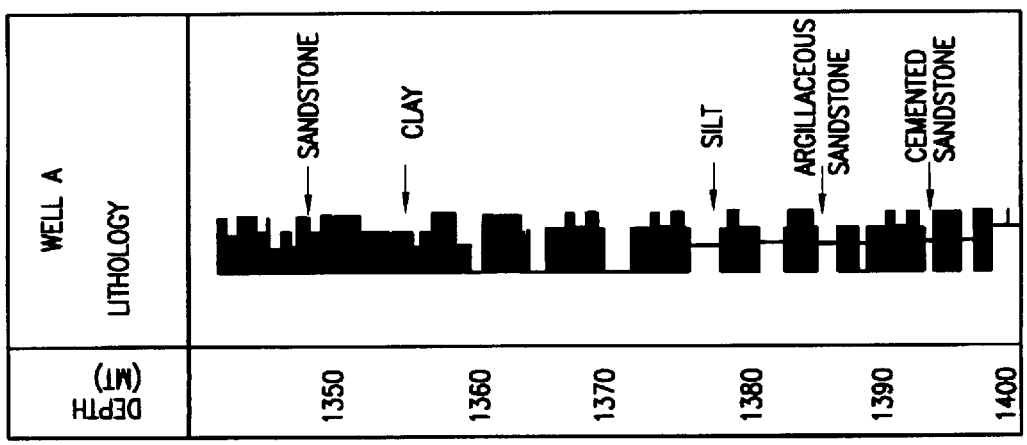

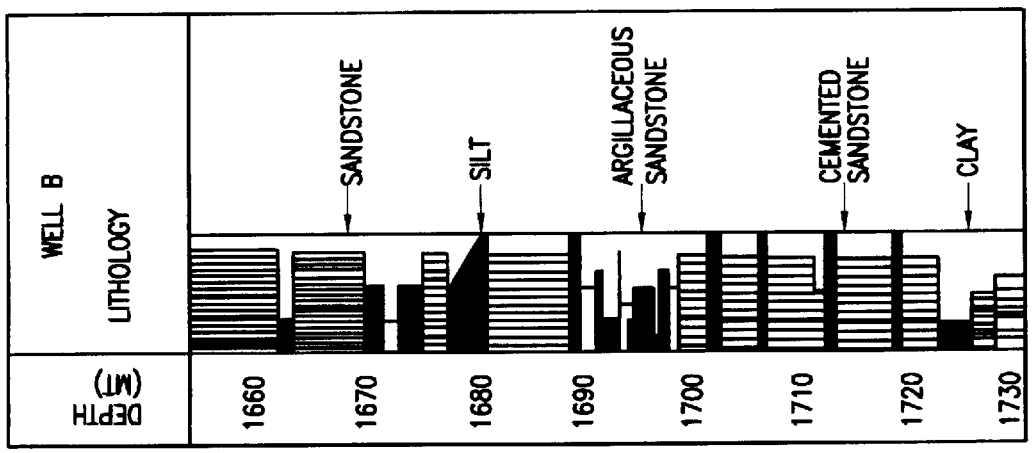
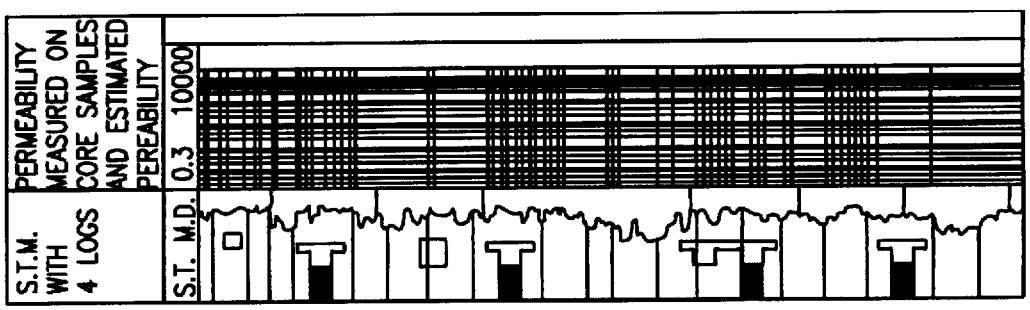

METHOD FOR CHARACTERIZING THE COHERENCE OF AN ENVIRONMENT CHARACTERISTIC MEASUREMENTS

BACKGROUND OF THE INVENTION

The present invention relates to a method of characterizing the coherence of measurements of characteristics of a medium and, more particularly, of logging data, said method making it possible, in particular, to characterize the relationships between, on the one hand, a qualitative variable whose origin is not logging-related and, on the other hand, logging measurements.

An oil field may, for example, comprise a number of wells which may be close together or far apart.

When studying such a field, geologists generally have available only a small number of core samples taken from one or more wells, which are then considered as being reference wells, the various measurements made on the core samples being considered as being reference measurements. On zones containing wells which are referred to as application wells and from which no core sample has been taken, specialists use other means for studying them, such as logging, seismic, etc. The data provided by these other means make it possible to determine petro-physical or other parameters and, in particular, to check their coherence with the measurements made on the available core samples. Checking and/or extrapolating data which are not related to core samples make it possible to characterize both quantitative variables and qualitative variables.

A geologist or another specialist, such as a sedimentologist, divides the zone from which core samples are available into a certain number of slices representative of various qualitative variables such as facies, sedimentary body, sedimentary environment, etc. Each of these variables is generally assigned a number.

For example, clay facies is referenced by the number 1, sand facies by the number 2, sandstone facies by the number 3, and so on. In this way, a qualitative variable is obtained which is referenced in depth and contains whole values, each value corresponding to one class of one logging viewpoint.

It should be noted that the measurements or descriptions on core samples may greatly exceed the resolution of conventional logging tools as used currently and, in particular, by the company SCHLUMBERGER. However, these descriptions are sometimes visual, and therefore subjective because they depend directly on the quality of observation by the geologist or the sedimentologist. It is not easy to obtain a comparison or a parallel between logging measurements made on one or more application wells because numerous "mixing" zones are often observed, that is to say the logging measurements may belong to several classes.

In order to reduce the specialist's subjectivity as far as possible, the use of statistical or neural classification methods has been advocated. Conventional statistical methods, such as those developed by TETZLAFF et al. at SPWLA in 1989, JIAN et al. in "Journal of Petroleum Geology, V. 17, January, p. 71–88, or GREDER et al. at SPWLA in 1995, give poor results when the classes overlap too much, because these so-called parametric methods assume that each class follows a Gaussian law. However, the shape of a class is generally more complex than a simple Gauss curve.

Neural classification methods, described in particular by CARDON et al. in 1991, ROGERS et al. in AAPG Bulletin 1992, V. 76, No. 5 p. 38–49, HALL et al. at SPWLA in 1995 or MOHAGHEGH in 1995 and 1996, also give poor results owing to the fact that the methods are highly sensitive to incoherences observed in the measurements. In neural networks whose learning is supervised, the network learns to recognize one shape from examples. However, a logging measurement may be attributed to one class in a first step, then be attributed to another class in another step. Neural networks with overlaid levels do not succeed in recognising that a single measurement is involved.

Reference was made above to core samples which are taken from one or more reference wells and on the basis of which classifications have been made using the methods summarized above. It should, however, be noted that the methods have also been applied to logging measurements produced directly in one reference well or several reference wells, for which the logging measurements have been considered as satisfactory because of their accuracy or since they were representative of qualitative variables of the well or wells. It is nonetheless true that the results obtained with the methods on reference logging measurements were unsatisfactory and suffered from the same drawbacks. Specifically, these methods give poor results when a facies not described in the learning set is encountered in an application well and/or when the quality of the logging measurements is compromised by defective calibration or corrections, or on account of poor acquisition conditions.

BRIEF SUMMARY OF THE INVENTION

The object of the present invention is to overcome the aforementioned drawbacks and to provide a method of characterizing the coherence of logging data which is not parametric and which permits to objectively evaluate whether a learning set, formed from logging data, can be used in application sets which are formed by logging data to be identified, by picking out the depth intervals over which a problem is detected. Indeed, the method according to the present invention does not require the knowledge of any a priori probabilistic model by virtue of the fact that each domain in the learning set is determined by k nearest neighbours searching.

The method of characterizing the coherence of measurements made in a given medium, is of the type consisting in:

taking N types of reference measurements at each point $(P_i)$ of a given reference set of said medium, each point $(P_i)$ being defined by a depth dimension, the group of N measurements which are associated with each point $(P_i)$ constituting a reference observation $(X_i)$, forming at least one N-dimensional learning set containing all the points $(P_i)$, taking at least N application measurements at each point $(Q_i)$ of an application set of said medium, which is different from the reference set, each group of application measurements which are associated with the point $(Q_i)$ constituting an application observation (x), comparing each application observation (x) with all the reference observations $(X_i)$ of the learning set, characterized in that it furthermore consists in:

constructing a neighbourhood domain $(D_i)$ for each reference observation $(X_i)$ of the learning step using the k nearest neighbours process (K-NN), said neighbourhood domains constituting the said learning set which defines an acceptance class $(C_a)$ for application observations (x) in the application set, defining a degree of membership of each application observations (x) to the acceptance class $(C_a)$ each application observation (x) being assigned to the acceptance class ($C_a$) when its membership degree is at least greater than a first threshold ($S_1$).

According to another characteristic of the invention, each application observation (x) is assigned to one of three classes consisting of the acceptance class ($C_a$), an ambiguity class ($C_o$) or a reject class ($C_d$).

According to another characteristic of the invention, the membership degree comprises at least two thresholds ($S_1$, $S_2$), the second threshold being less than the first threshold ($S_1$).

According to another characteristic of the invention, an application datum (x) is assigned to the reject class ($C_d$) when its membership degree is less than the second threshold ($S_2$)

According to another characteristic of the invention, an application datum (x) is assigned to the ambiguity class when its membership degree lies between $S_1$ and $S_2$.

According to another characteristic of the invention, the membership degree is defined by the membership function:

$$\mu_i(x) = e^{\left[-\frac{x-X_i}{\sigma_i}\right]} \quad (1)$$

in which $X_i$ is an observation in the learning set, i lying between 1 and $n_a$, $n_a$ corresponds to the number of reference observations in the learning set, $\sigma_i$ is the radius of the domain centred on the observation $X_i$, x is an application observation in the application set.

According to another characteristic of the invention, in order to clarify an ambiguity attached to an application observation (x), an (n−1)-dimensional learning set is constructed, the dimension removed corresponding to one type of measurements.

According to another characteristic of the invention, the membership degree $\mu(x)$ corresponds to the mean of the k' strongest memberships $\mu_i(x)$ to the domains $D_i$ in the learning set.

According to another characteristic of the invention, the mean k' lies between 1 and k.

According to another characteristic of the invention, the value of k' is very much greater than 1.

Other advantages and characteristics of the present invention will become more clearly apparent on reading the method, as well as the appended drawings in which:

BRIEF DESCRIPTION OF THE DRAWINGS

FIGS. 4A to 4C are logging representations for a well A;

FIGS. 5A to 5C are logging representations for a well B;

DETAILED DESCRIPTION OF THE INVENTION

Figure 1:
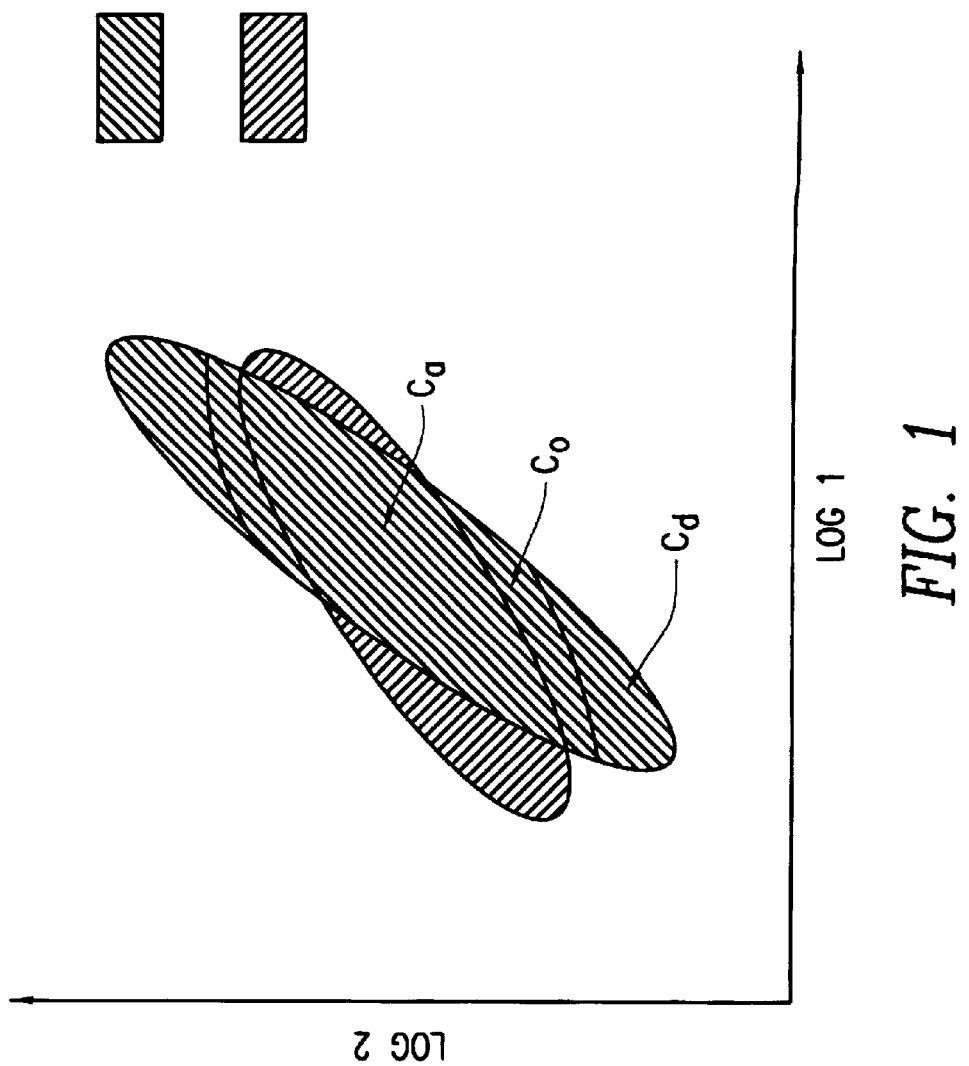
FIG. 1 is a schematic representation of the acceptance ($C_a$), ambiguity ($C_o$) and reject ($C_d$) classes which are used in the method according to the present invention.

In a given medium, for example an oil field, N separate preliminary measurements are taken or made, each corresponding to one of the physical characteristics of the subsurface of the medium. The nature of the preliminary measurements is arbitrary. They may be statistical measurements made using specific tools or with the aid of suitable methods. They may also be measurements made on one or more core samples taken from one or more wells in the oil field, or alternatively logging measurements made in one or more boreholes. In all cases, these preliminary measurements constitute reference measurements according to the invention. The part of the medium in which the preliminary measurements are made defines the reference set.

In the same way, the measurements which are made in another part of the medium, separate from the previous one, are considered in the present invention as being application measurements which will be compared with the reference measurements. The part of the said medium in which these application measurements are made defines an application set which may consist of one or more other wells in the oil field.

In the rest of the description, and by way of example, the reference measurements are logs which are representative of a particular lithology observed in the reference set, in particular in one or more boreholes in the reference set.

The logs are used for forming a learning set, and the lithology example in question comprises the following facies: sandstone, silt, and cemented sandstone with traces of argillaceous sandstone and clay. The logs used are, in particular, those known by the references RHOB for measuring density, VSH for clay indication, DT for measuring the propagation speed of the waves in the medium and ILD for measuring the deep resistivity. Clearly, the number of logs may be increased or decreased.

The measurements N associated with each point $P_i$, of depth Z, in the reference set constitute a reference observation $X_i$.

In the same way, the N measurements associated with each point $Q_i$, of depth Z, in the application set constitute an application observation x.

A first step in the present invention consists in defining in multidimensional space, for example with N dimensions where N is equal to the number 4 of selected logs in the example of the invention, a learning set which comprises all the points $P_i$ and with which each application observation x is compared.

The form of the learning set, several sections of which are represented in FIGS. 6A to 9A in the form of cross plots with two dimensions RHOB and DT, or ILD and DT, is defined by characterizing neighbourhood domains $D_i$. Each neighbourhood domain is centred on a reference observation $X_i$ and is constructed by looking for the k nearest neighbours of each observation $X_i$. The set of domains $D_i$ constitutes the learning set which, in turn, constitutes a class referred to as the acceptance class $C_a$. The process for searching for the k nearest neighbours is, in particular, described in the article by DASARATHY B. V. 1991, "NEAREST NEIGHBOR (N.N.) NORMS: nn pattern classification technics" IEEE Computer Society Press TUTORIAL, or O'CALAGHAN J. F. 1975, "An alternative definition for neighborhood of a point", IEEE transactions on computers NOV, 1121–1125.

In a second step, a membership degree to the acceptance class $C_a$ is defined. A decision rule makes it possible to discriminate the observations of an application well according to its membership degree to the acceptance class $C_a$. When the membership degree is greater than a first threshold $S_i$, the application observation is assigned to the acceptance class $C_a$.

When the membership degree of the application observation is less than the threshold $S_i$, the said observation is either definitively rejected, in which case it is assigned to a so-called reject class ($C_d$), or is considered as being ambiguous, in which case it is assigned to a so-called ambiguity class ($C_o$) This is what is schematically represented in FIG. 1, the acceptance $C_a$, ambiguity $C_o$ and reject $C_d$ classes being schematically formed as ellipses, respectively designated by $C_a$, $C_o$ and $C_d$ on a cross plot of log 1 and log 2, it being possible for the latter to be RHOB, DT, VSH or ILD.

When the observations of an application well have a high membership degree, it is because they are close to points constituting the learning set and they are generally included in several domains $D_i$ of the learning set.

When the observations of the same application well have a medium membership degree, it can be inferred from this that they are not too far in terms of Euclidian distance from the points in the learning set, but they possibly may not be included in any of the domains $D_i$. Such observations are then classed in the ambiguity class $C_o$.

Lastly, when the observations of the application well have a low membership degree, they are considered as being far in terms of Euclidian distance from the points in the learning set, and they are grouped in the reject class $C_d$.

Figure 2:
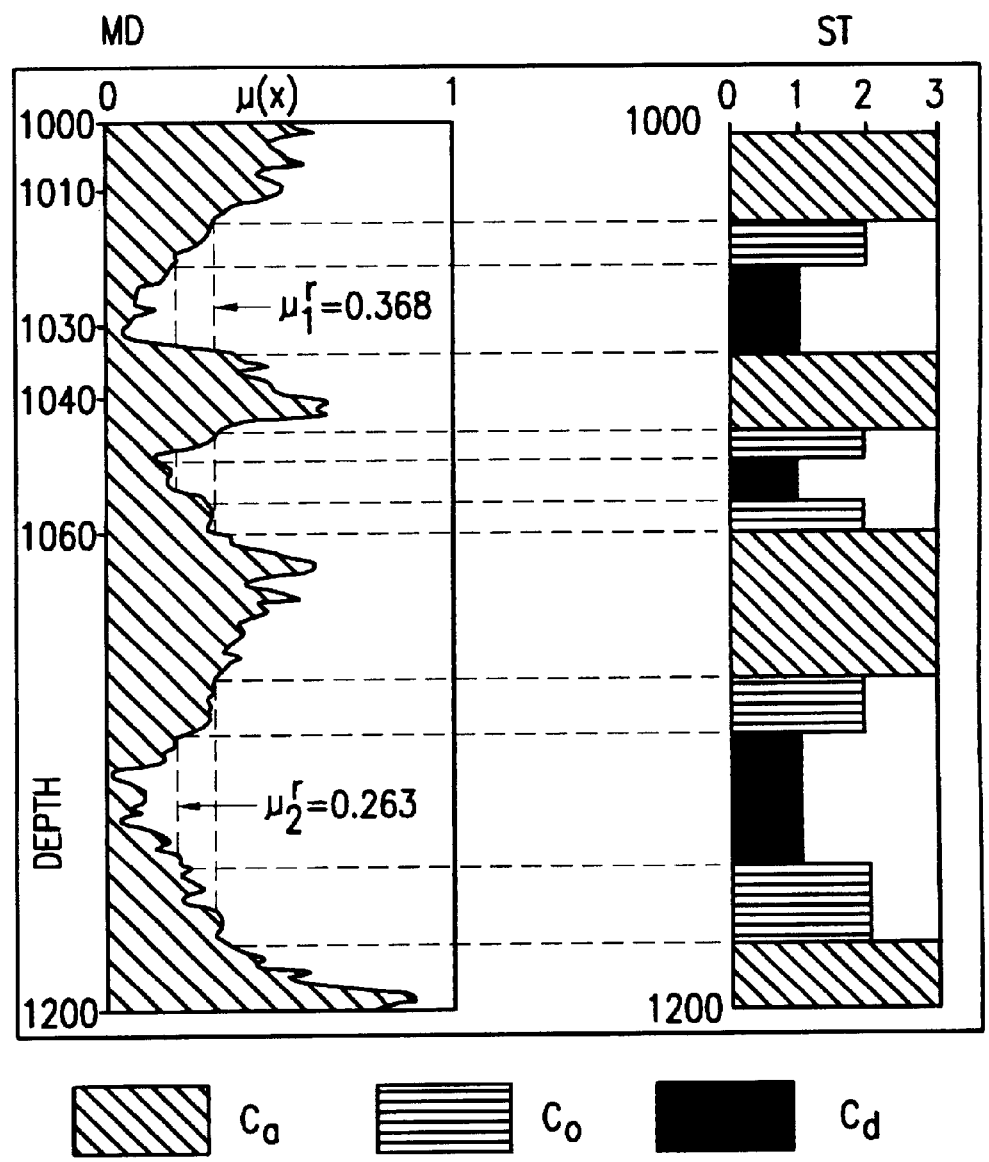
FIG. 2 is a synthetic representation in logarithmic form of the degrees of threshold similarity (ST) and similarity degree (MD)

The membership degree and the assignment to one of said classes, for the application observations, can be grouped in the form of two logs: a similarity threshold log (or "ST") and a similarity degree log (membership degree log or "MD"), as represented by way of synthetic example in FIG. 2, the two logs being represented as a function of depth. On the left-hand part of FIG. 2, which represents the similarity degree log, it can be seen that this degree is relatively high for the beds with depths 1000, 1010, 1040 and 1200, and low between depths 1020 and 1030, for depth 1050 and between depths 1060 and 1080. Correspondingly, and for the same depths on the similarity threshold log (right-hand part of FIG. 2), it can be seen that an observation made in the application well between depths 1000 and 1015 would be accepted, but between depths 1015 and 1020 it would be considered as ambiguous and therefore assigned to the ambiguity class $C_o$, and that between depth 1020 and slightly more than depth 1030, it would be rejected and therefore assigned to the reject class $C_d$. The same comments hold true for the other depths of the application well. For the sake of simplicity and clarity, the three classes of acceptance $C_a$, ambiguity $C_o$ and reject are represented with different shading, as indicated in the lower rectangles in FIG. 2.

Figure 3:
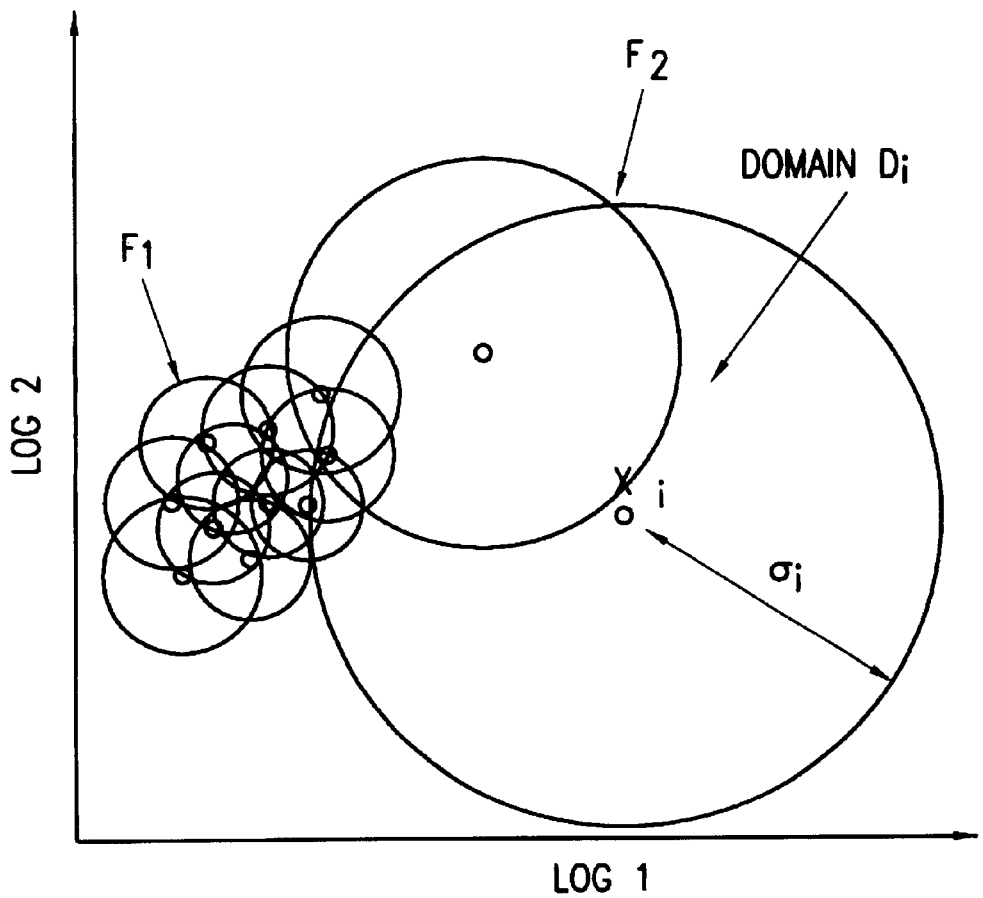
FIG. 3 is a schematic representation of the neighbourhood domains $D_i$ of the learning set as constructed according to the method of the present invention.

In the learning set consisting of the domains which are defined by the known k nearest neighbours process (FIG. 3), there are small domains in the strongly populated regions of space, that is to say they have a small sphere radius $\sigma_i$ and large domains in the weakly populated regions of space with a high radius $\sigma_i$. The small domains lie in the zone of FIG. 3 indicated by the arrow F1, and the large domains are indicated by the arrow F2. The radius $\sigma_i$ corresponds to the Euclidian distance between $X_i$ and its $k^{th}$ nearest neighbour.

The choice to construct overlapping domains with variable size has at least one geological reason. This is because the dispersion of the observations may differ greatly depending on the lithology present in the logging space. For example, observations recognized as characteristic of sandstone formations show much less dispersion than observations associated with clay formations.

Since an excessive size of the domains $D_i$ may pose a problem in terms of the validity of assignment to one of the classes because points which are far apart in terms of Euclidian distance may be assigned to the acceptance class $C_a$, it is important according to the invention to determine the number k properly, this being so that the isolated points in the learning set are not eliminated. Indeed, isolated points may identify very significant geological facies even if they are not strongly represented and their logging characteristics locate them very much away from the most strongly represented facies.

One important characteristic of the invention therefore relates to the choice of the number k. Since no rule has clearly been defined for determining k in the literature pertaining to the k nearest neighbours process, the invention advocates construction of the domains on the reference observations so as to characterize the space occupied by these observations. When the number of nearest neighbours k is close to 1, the domains are of small size and essentially do not overlap with one another. The risk of rejecting an observation of an application well while it is projected between several domains is then high. Furthermore, if the number k is increased greatly, this means that there is a great deal of overlap between the domains, then there is a risk of accepting an observation while it is far in terms of Euclidian distance from all the domains. The compromise of the invention consists in combining the "leave one out" technique with the k nearest neighbours technique. One characteristic of the present invention therefore consists in removing an observation from the learning set and classing this observation on the basis of the $n_a-1$ remaining observations, and this process is repeated $n_a$ times. The error criterion is the number of application observations not assigned to the acceptance class $C_a$. The number of nearest neighbours k is chosen so that the error probability is not very high, for example less than 10%.

The degree of membership of each observation x of a well or application set to each of the domains $D_i$ in the learning set is defined by a membership function which can be written in the form of the following expression:

$$\mu_i(x) = e^{\left[-\frac{x-X_i}{\sigma_i}\right]} \tag{1}$$

in which
 $X_i$ is an observation in the learning set, i lying between 1 and $n_a$,
 $n_a$ corresponds to the number of $D_i$ observations in the learning set,
 $\sigma_i$ is the radius of the domain centred on the observation $X_i$,
 x is an observation in the application set.

The membership of an observation x in the application set to a domain $D_i$ is a maximum for $\mu_i(x)=1$ and a minimum for $\mu_i(x)$ tending to zero.

The membership degree $\mu(x)$ corresponds to the mean of the k' strongest memberships $\mu_i(x)$ to the domains $D_i$ in the learning set, k' being fixed by the user on the basis of the intended purpose and, in order to limit the effect of isolated points in the classification process, it is chosen between 1 and k and, preferably, much greater than 1. A choice of k' close to 1 does not make it possible to demonstrate the clay tendency which can be noted in FIGS. 8C and 8D or FIGS. 9C and 9D, because of the presence, in the learning sets of FIGS. 8A and 9A, of a few reference observations corresponding to traces of clay facies, indicated by the three extreme points on the right of FIG. 8A or by the three points at the bottom right of FIG. 9A.

Thus, an observation x lying far from the domains $D_i$ in the learning set has a low degree of membership to the acceptance class $C_a$ and is rejected from said acceptance class $C_a$ if its membership degree is less than a threshold $S_1$. However, the observation x may be considered as ambiguous if its membership degree is greater than a second threshold $S_2$.

The decision rule can be written in the following way:

x assigned to $C_a$ if $\mu(x) \geq S_1$ x assigned to $C_o$ if $S_2 \leq \mu(x) < S_1$ x assigned to $C_d$ if $\mu(x) < S_2$ An observation x belonging to an application set is projected into a domain $D_i$ centred on an observation in the learning set if the Euclidian distance between x and $X_i$ is less than the radius $\sigma_i$ of its domain. Consequently, the first threshold $S_1$ is equal to $e^{-1} \approx 0.3679$ by applying the above formula with $x - X_i = \sigma_i$.

The second threshold $S_2$ must lie between 0 and $S_1$. The threshold $S_2$ makes it possible to define a zone of ambiguity between acceptance and rejection. The large number of tests carried out have allowed the threshold $S_2$ to be fixed advantageously at a value equal to $e^{-1.3}$. The same tests show that, in the learning set, the error probability connected with the threshold $S_2$ is about 5%.

FIGS. 4A to 9D are examples of implementation of the method according to the invention on two application wells A and B.

In a field comprising the application wells A and B and reference wells, the intention is to construct a model for estimating the permeability in order to extrapolate it to all the wells in the field. The learning set which will be established by the logger contains permeability measurements made on core samples taken from four reference wells which have been deemed to be representative of the geological formations encountered on the field. In the examples described, the formations are essentially sandstone/clay with conglomerated facies (deposited in winding channels or meanders and in the flood plain). Prior to this, a stepwise discriminant analysis method has made it possible to evaluate which the most discriminant logs are for estimating the permeability. The logs adopted are given under their commercial abbreviation as defined by the company SCHLUMBERGER, namely RHOB for the density of the formation, DT for the slowness or speed of propagation of the waves in the rock, VSH for the clay index, ILD for the deep resistivity. The N-dimensional space of the method described above therefore corresponds to a four-dimensional space since four representative logs are used.

FIG. 4A represents the lithology in question at various depths (right-hand part of the figure).

FIG. 4B (left-hand part) represents the membership degree under the two log forms, ST for the similarity threshold and MD for the similarity degree. The right-hand part of FIG. 4b represents the permeability measured on a core sample, as well as the prediction of the permeability when the four logs RHOB, VSH, DT and ILD are taken into consideration, the prediction being given with a logarithmic scale ranging from 0.1 to 10,000.

Figure 6A:
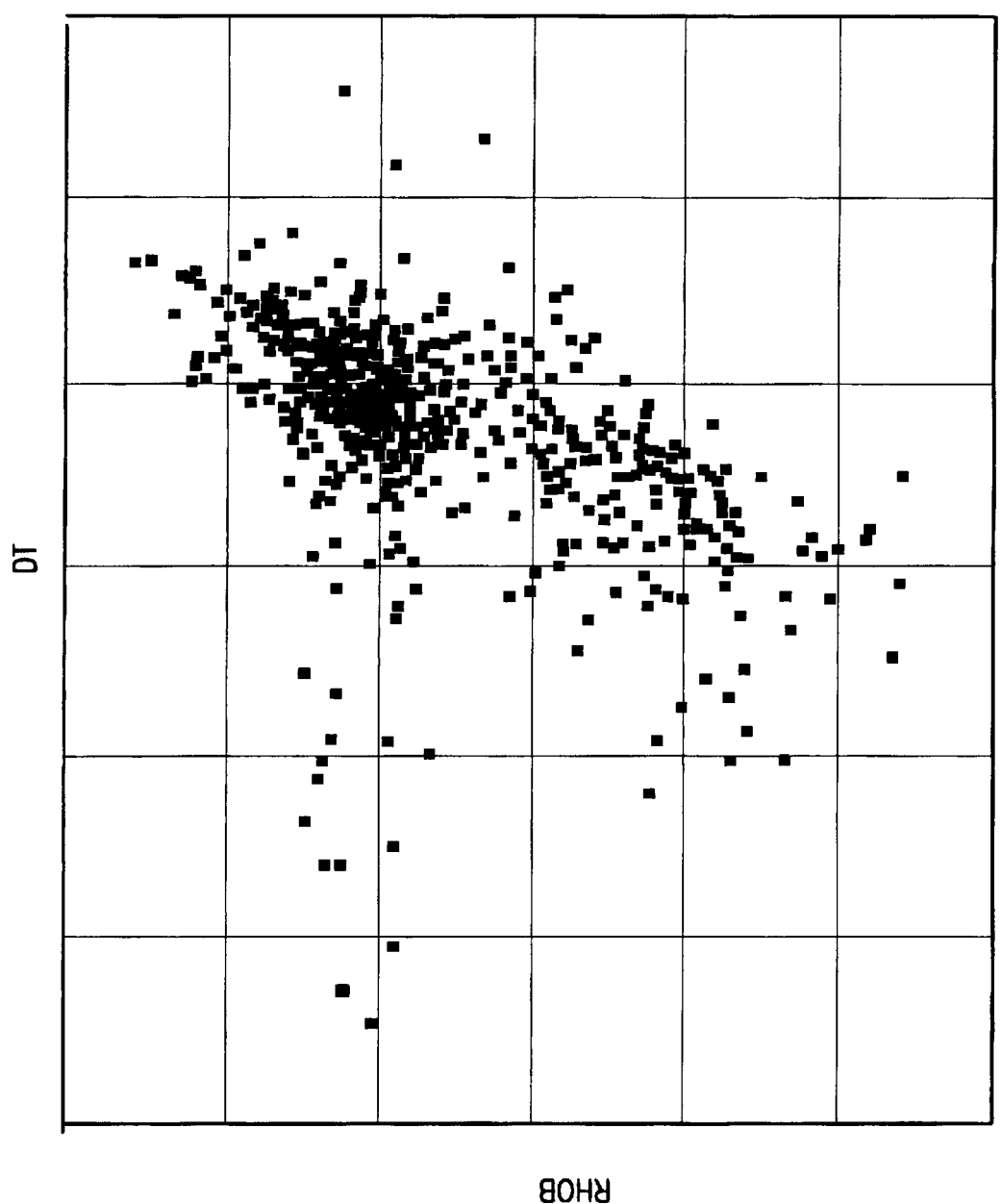
FIGS. 6A to 6D are cross plots of a learning set and acceptance ($C_a$), ambiguity ($C_o$) and reject ($C_d$) relating to well A.
Figure 6B:
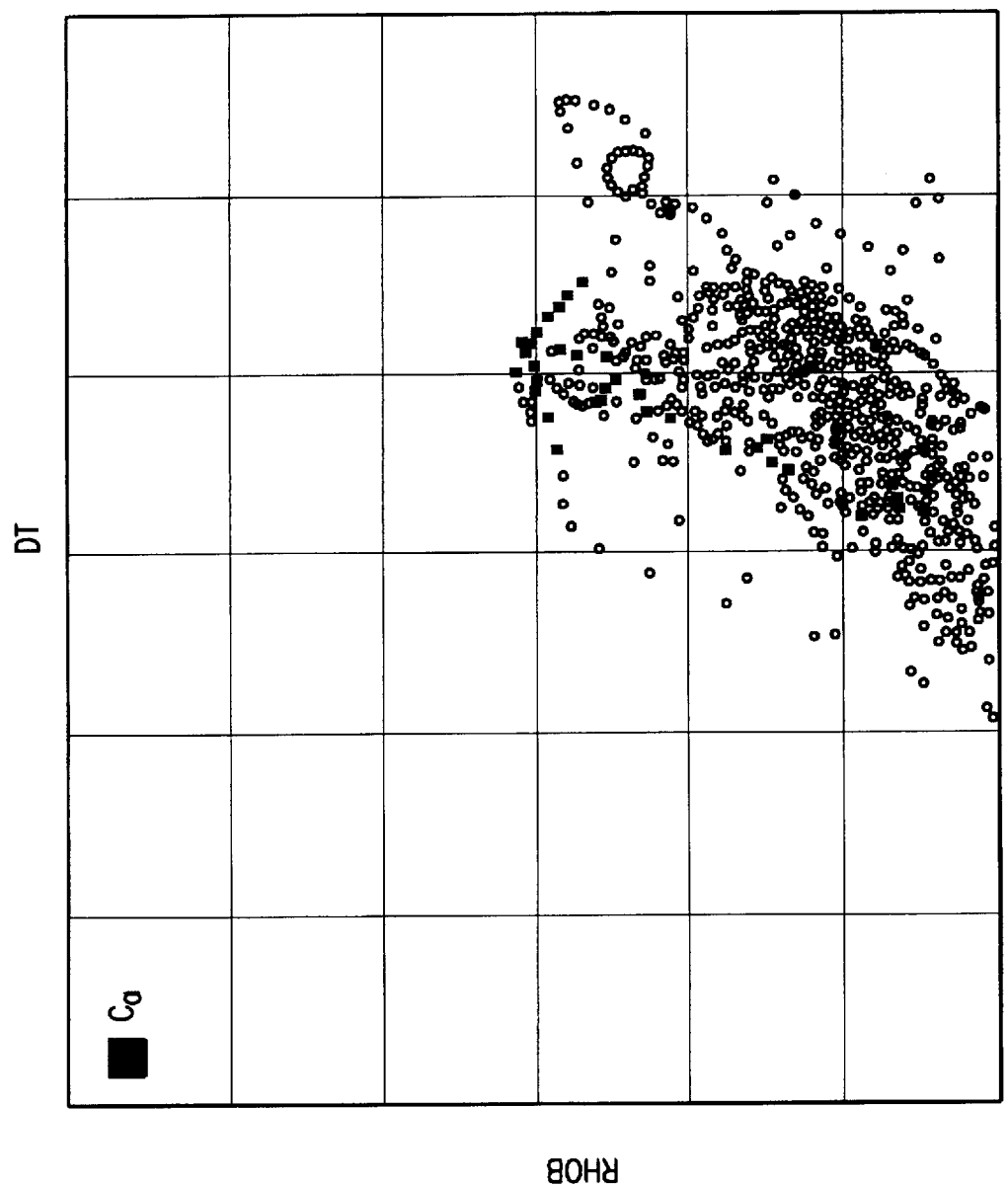
Figure 6C:
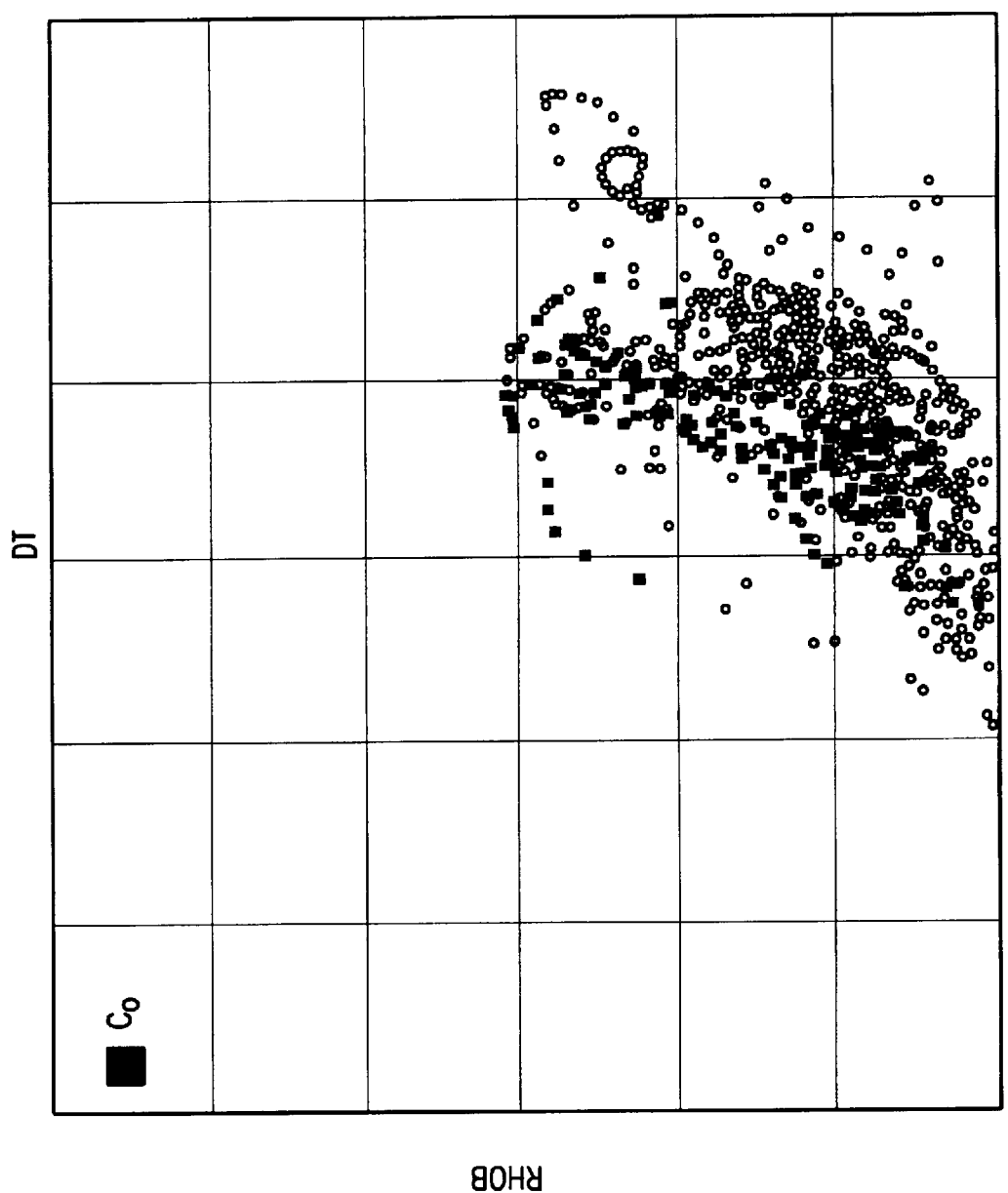
Figure 6D:
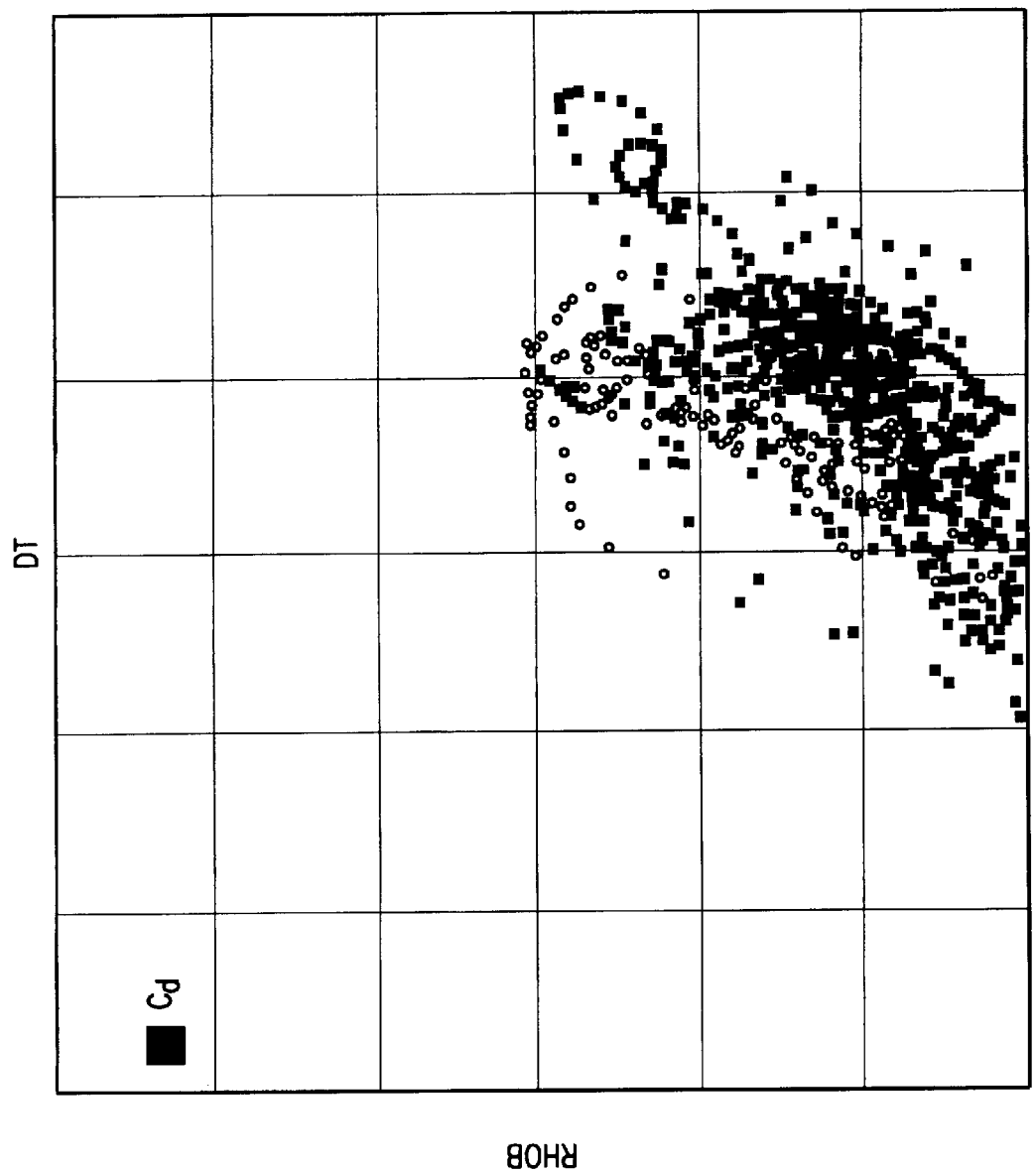

When the similarity degree MD is examined, it is found to be relatively small. This means that there is a low membership degree to the class $C_a$, without it being possible to define the reasons for this rejection, which is ambiguous in places. This is confirmed by FIGS. 6A to 6D, in which FIG. 6A represents the learning set and FIGS. 6B, 6C and 6D respectively represent the acceptance $C_a$, ambiguity $C_o$ and reject $C_d$ classes. In FIG. 6B, only a few black points appear, which signifies that there are very few points similar with the learning set in FIG. 6A, while they are slightly more numerous in the ambiguity class $C_o$ (FIG. 6C) and relatively numerous in the reject class $C_d$ (FIG. 6D).

To confirm or deny total rejection, the same procedure as before is adopted, each time removing one log RHOB, VSH, DT or ILD, that is to say the space is reduced to n−1 dimensions on each occasion.

Figure 7A:
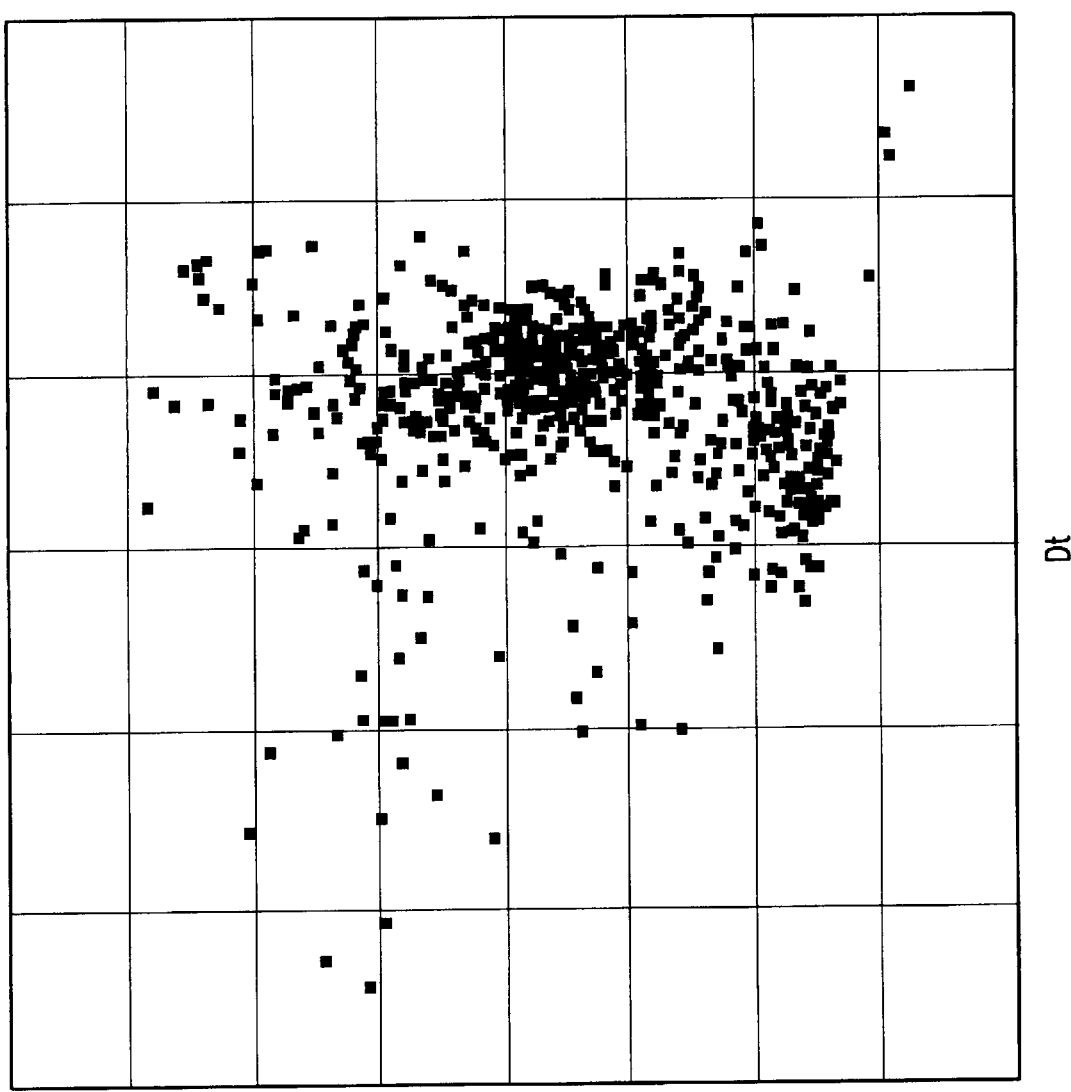
FIGS. 7A to 7D are diagrams similar to those in FIGS. 6A to 6D but with removal of one type of measurement, in this case RHOB.
Figure 7B:
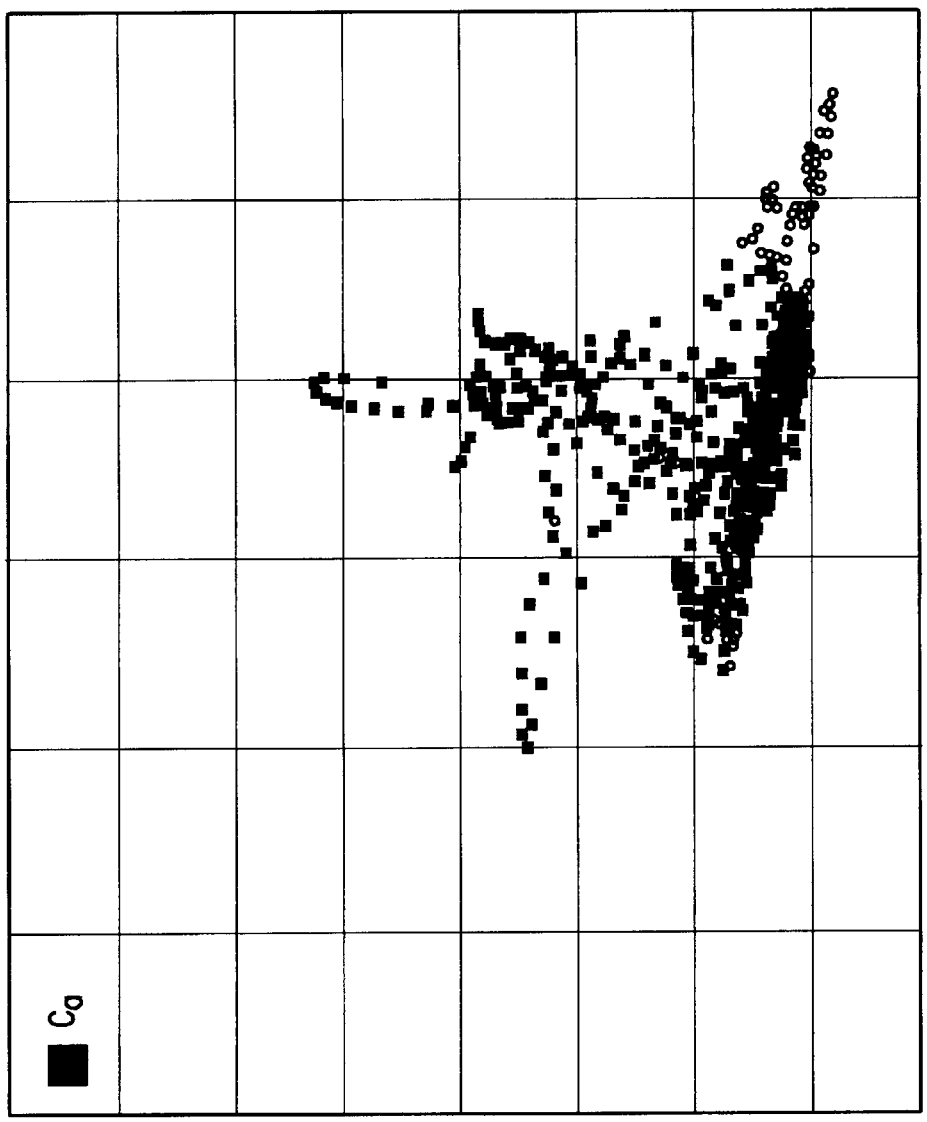
Figure 7C:
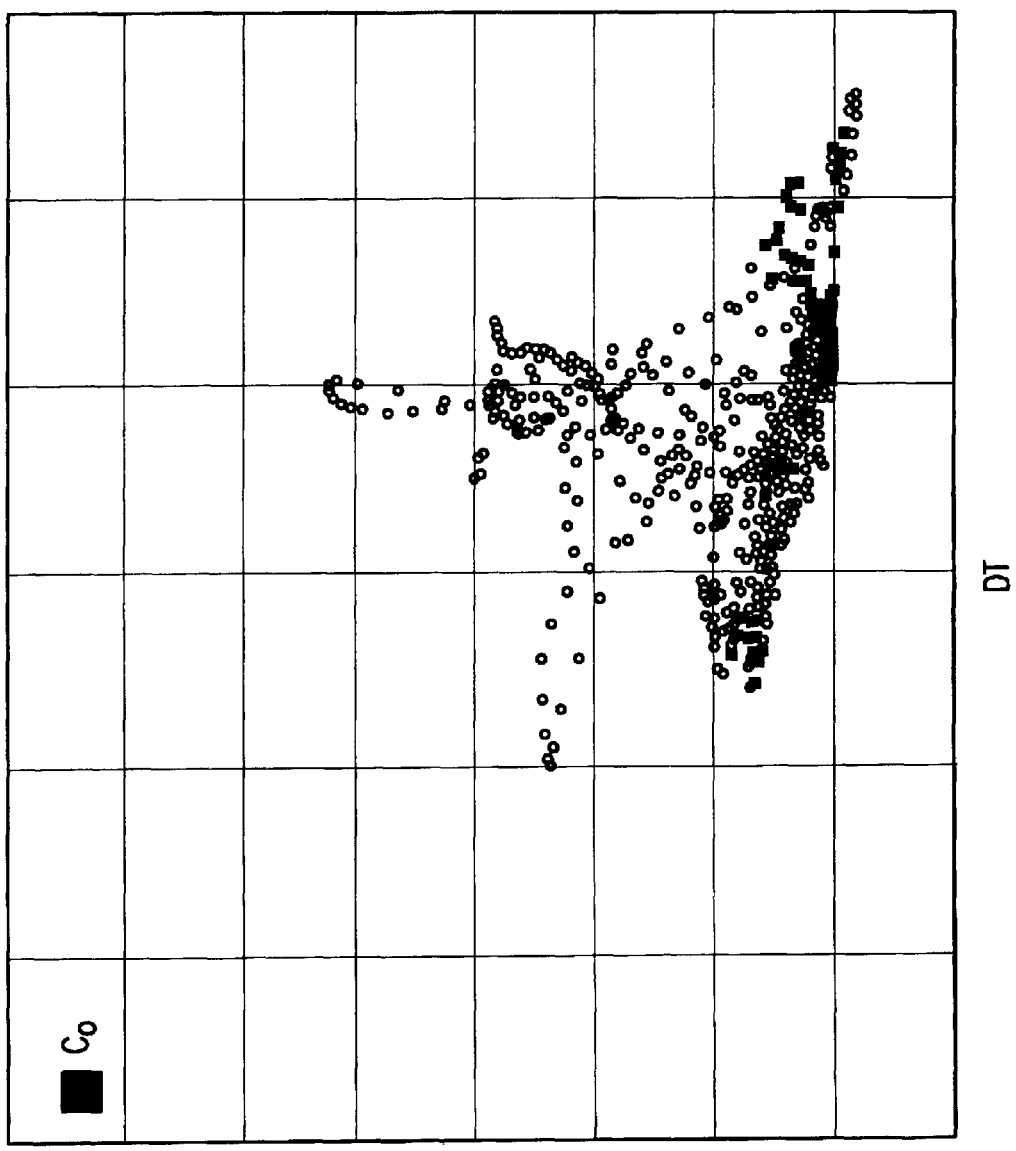
Figure 7D:
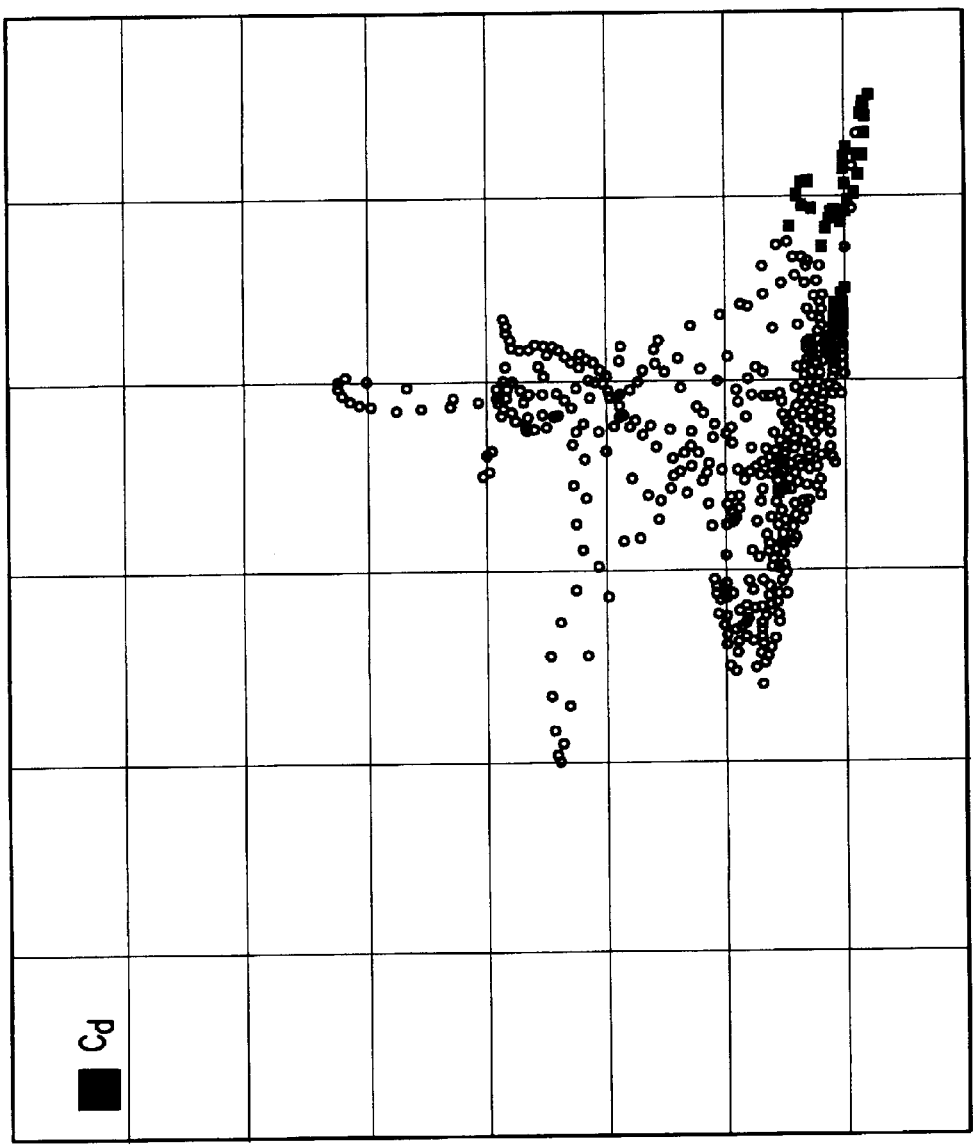
Figure 8A:
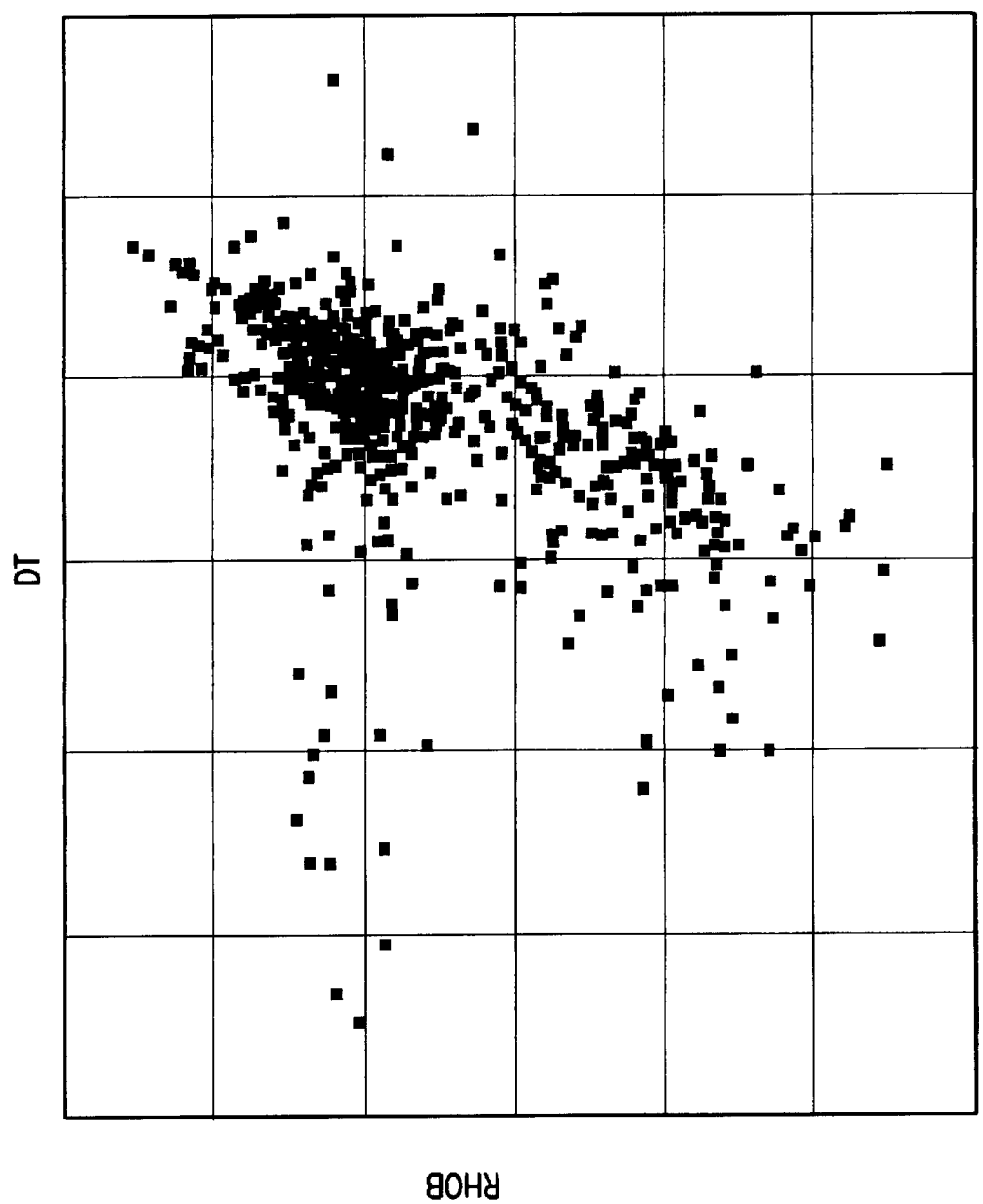
FIGS. 8A to 8D are cross plots of a learning set and acceptance ($C_a$), ambiguity ($C_o$) and reject ($C_d$) relating to well B.
Figure 8B:
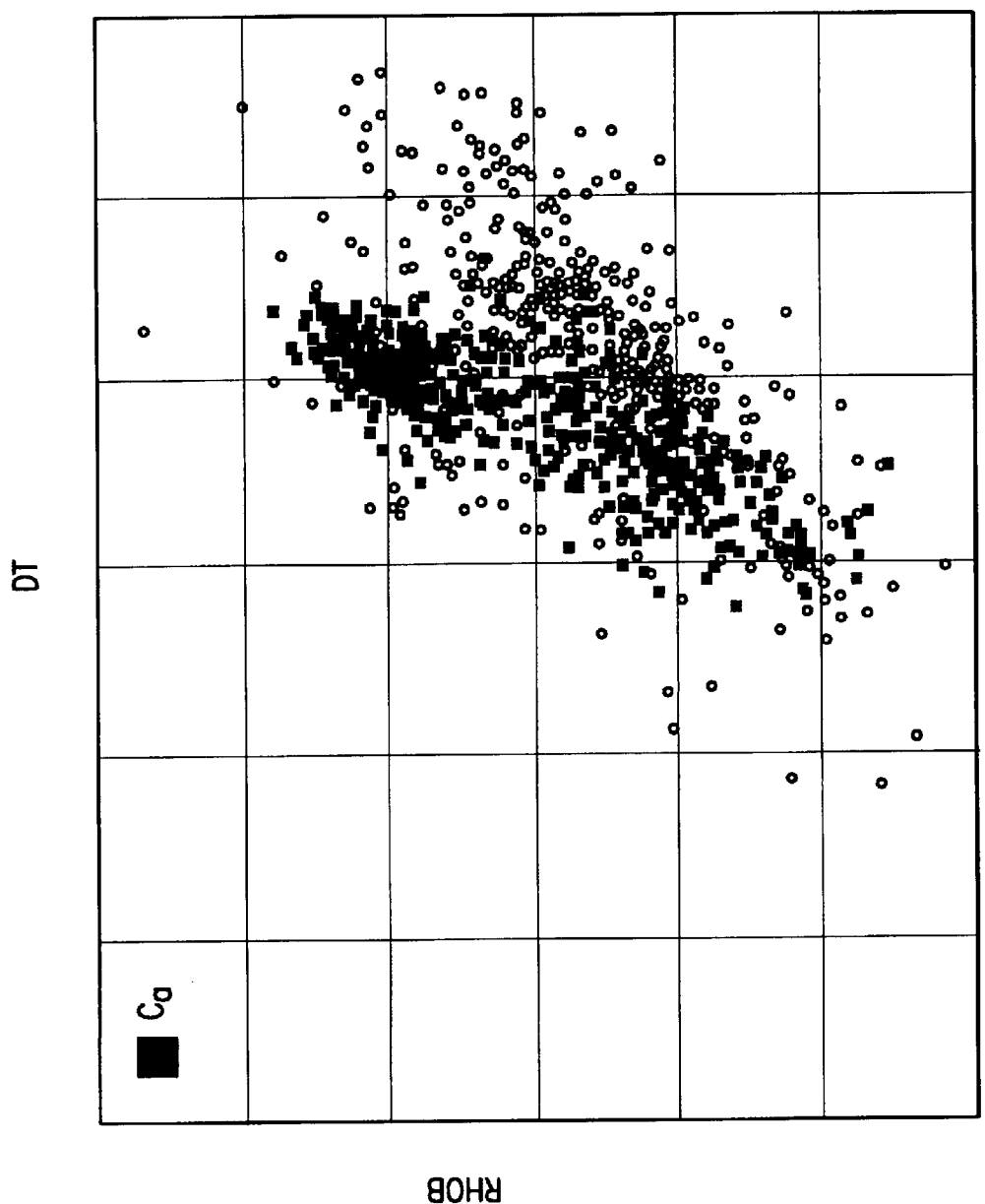
Figure 8C:
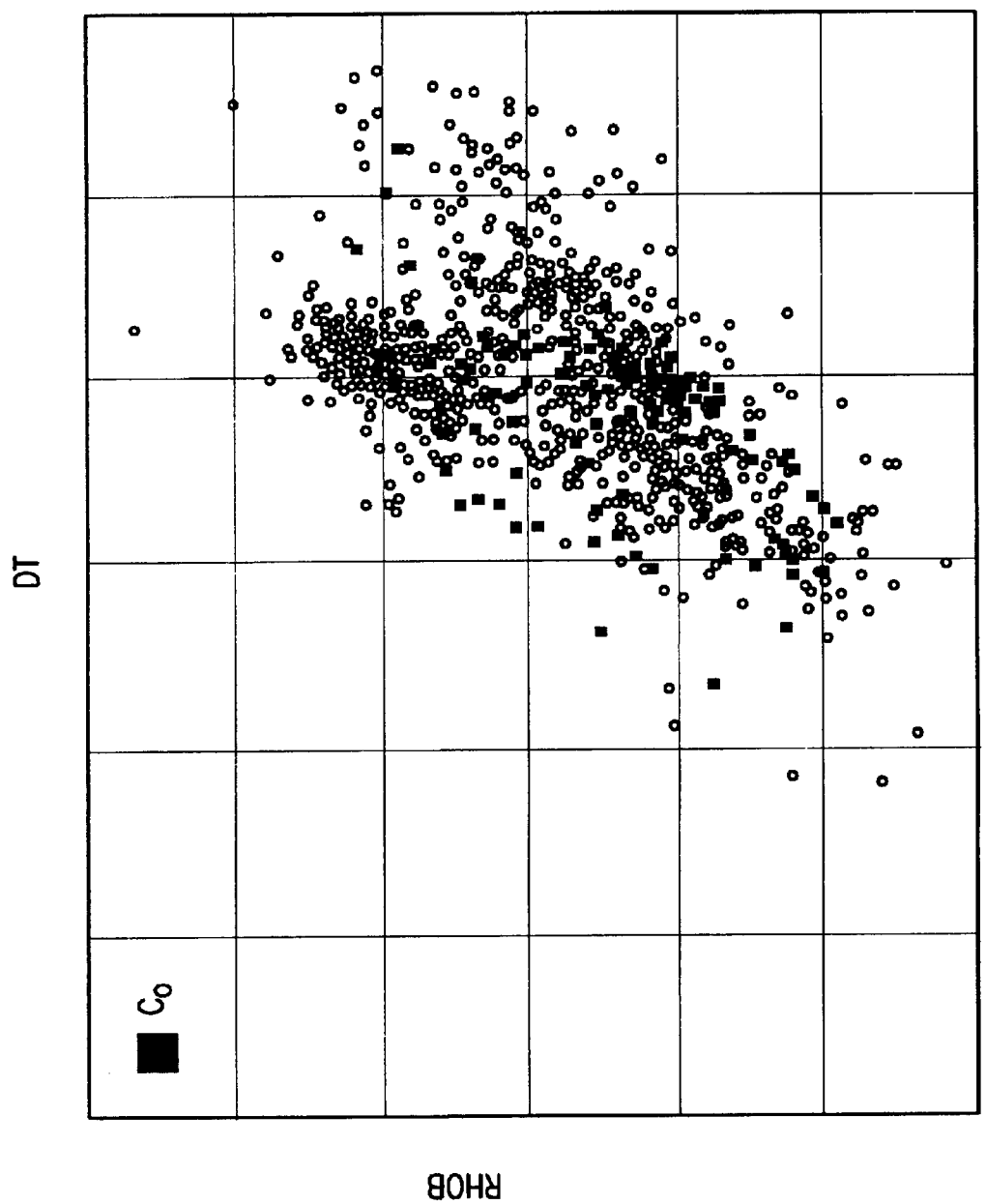
Figure 8D:
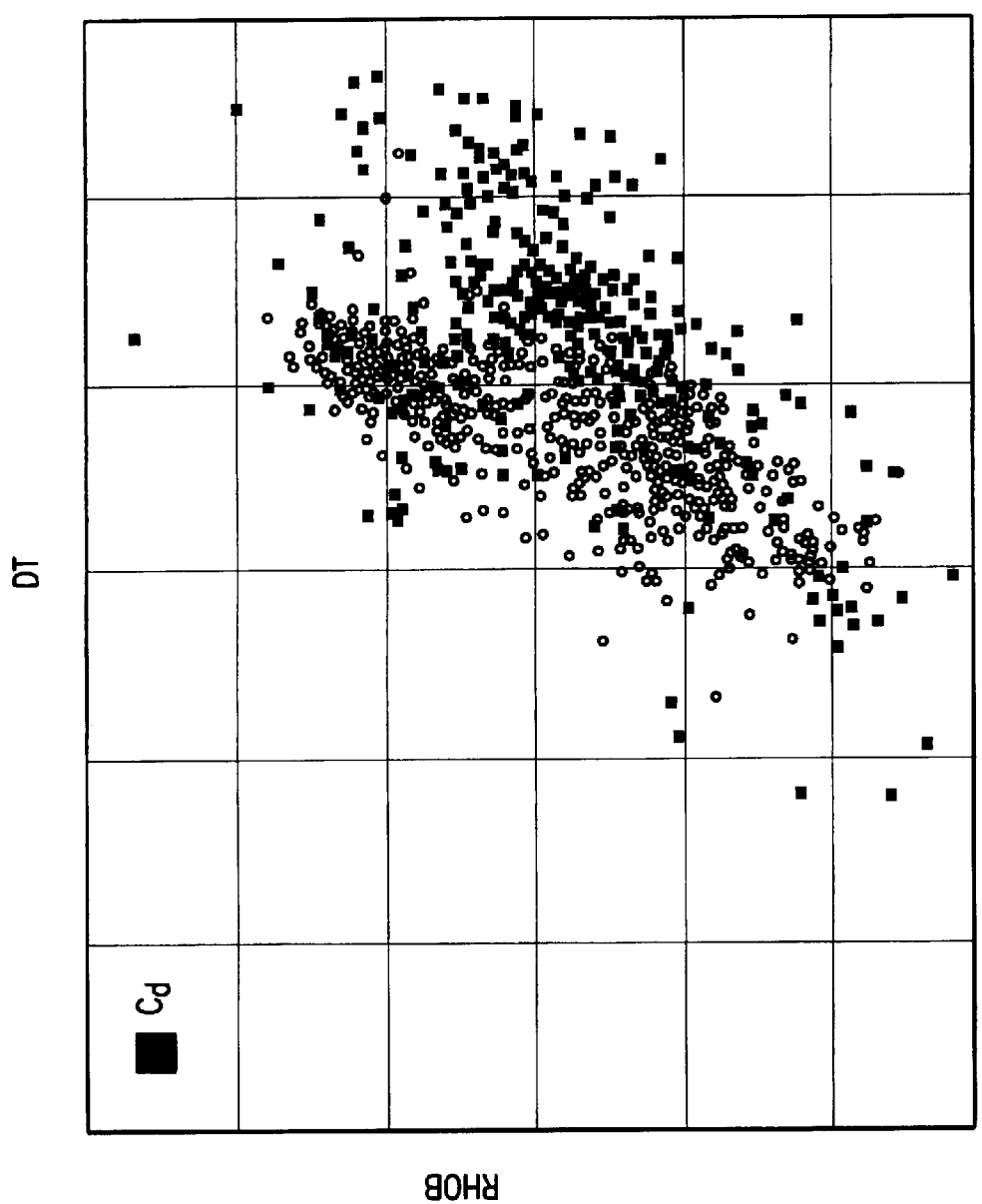
Figure 9A:
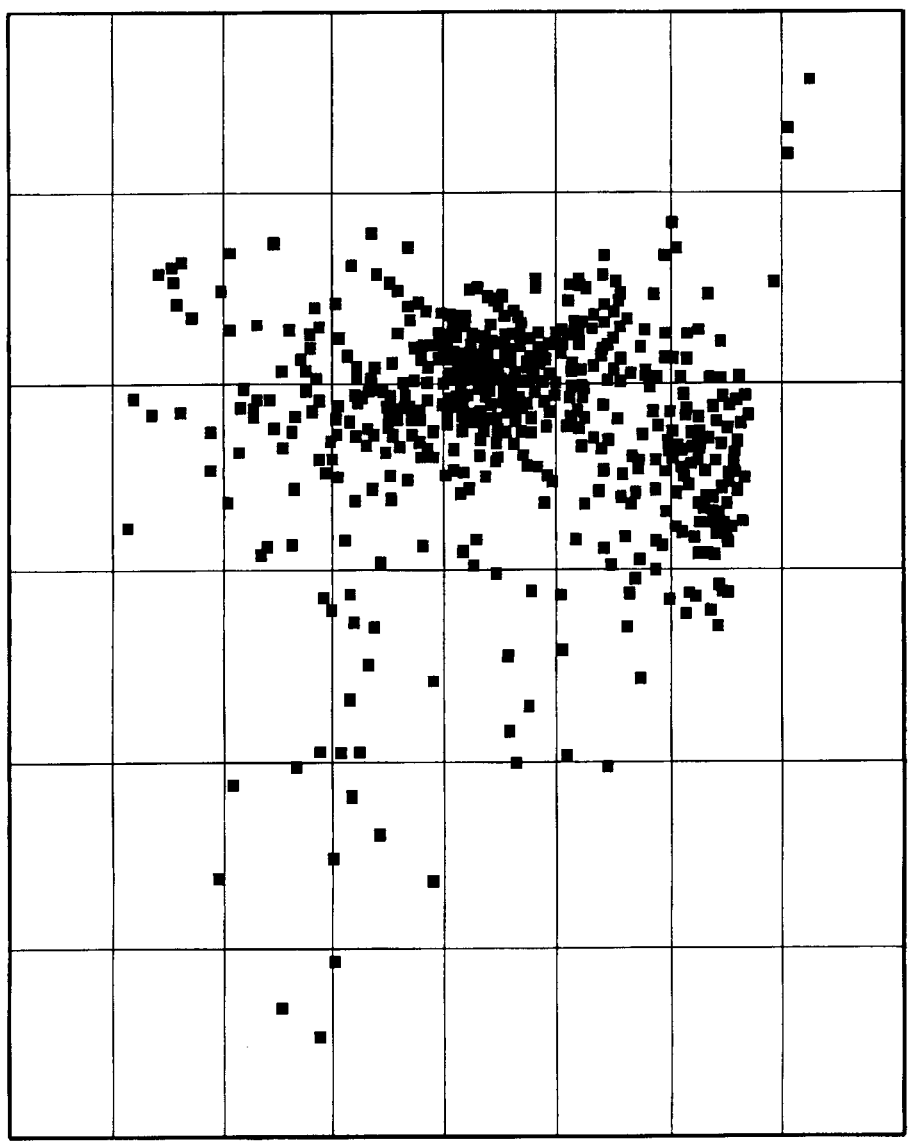
FIGS. 9A to 9D are diagrams similar to those of FIGS. 8A to 8D but whose co-ordinates are ILD and DT.
Figure 9B:
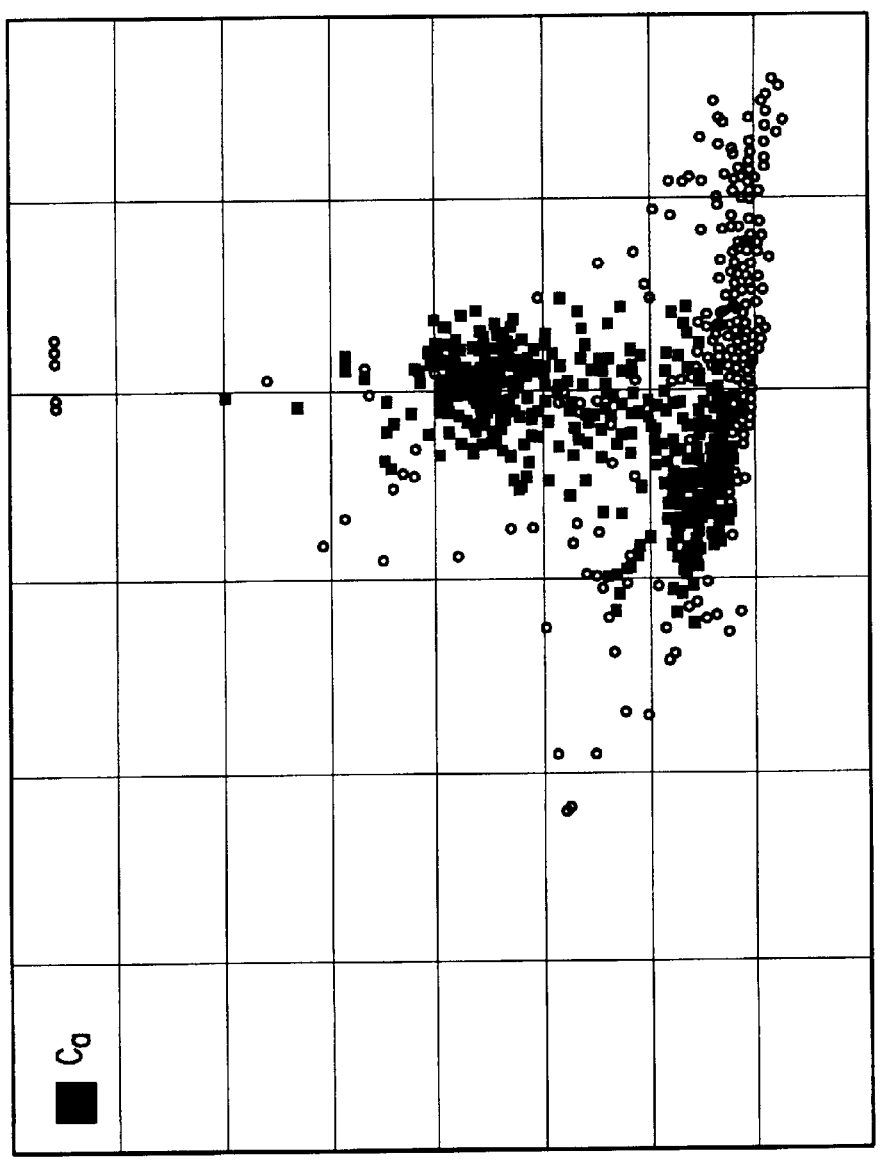
Figure 9C:
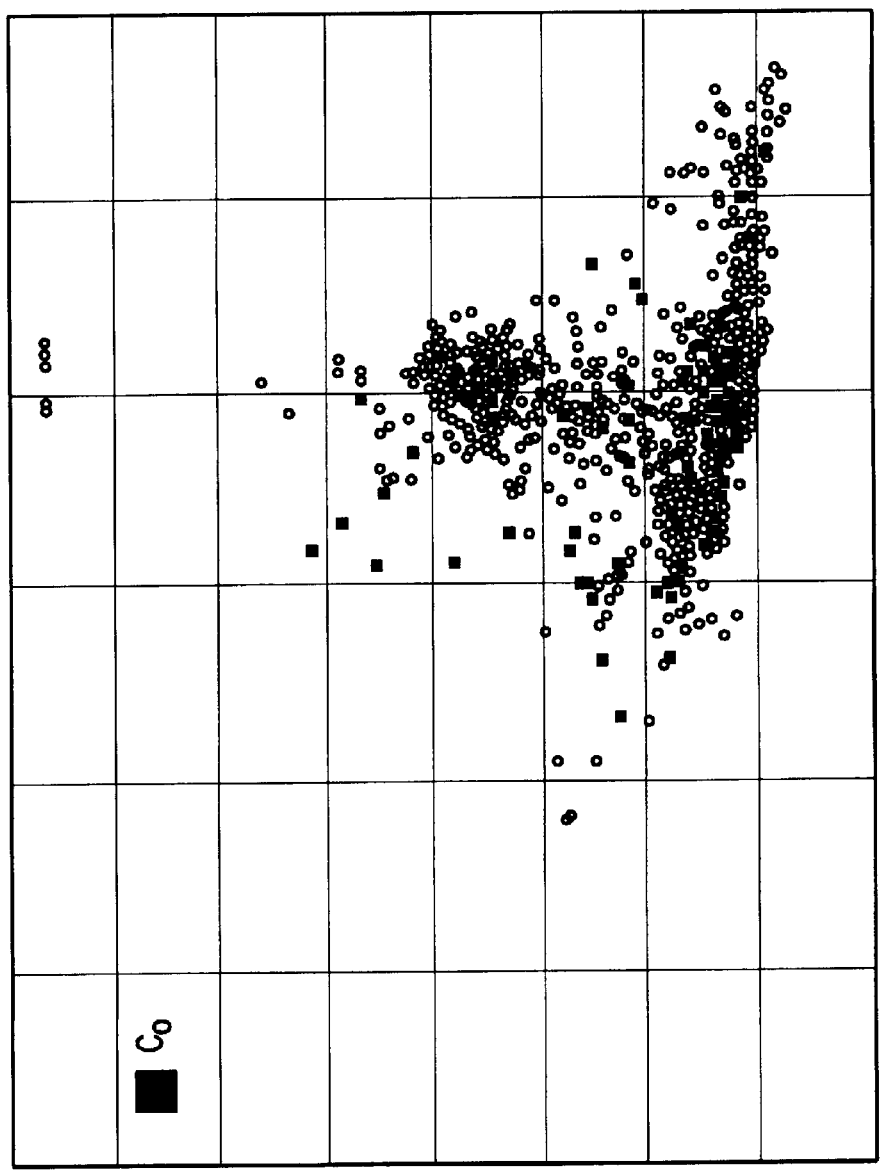
Figure 9D:
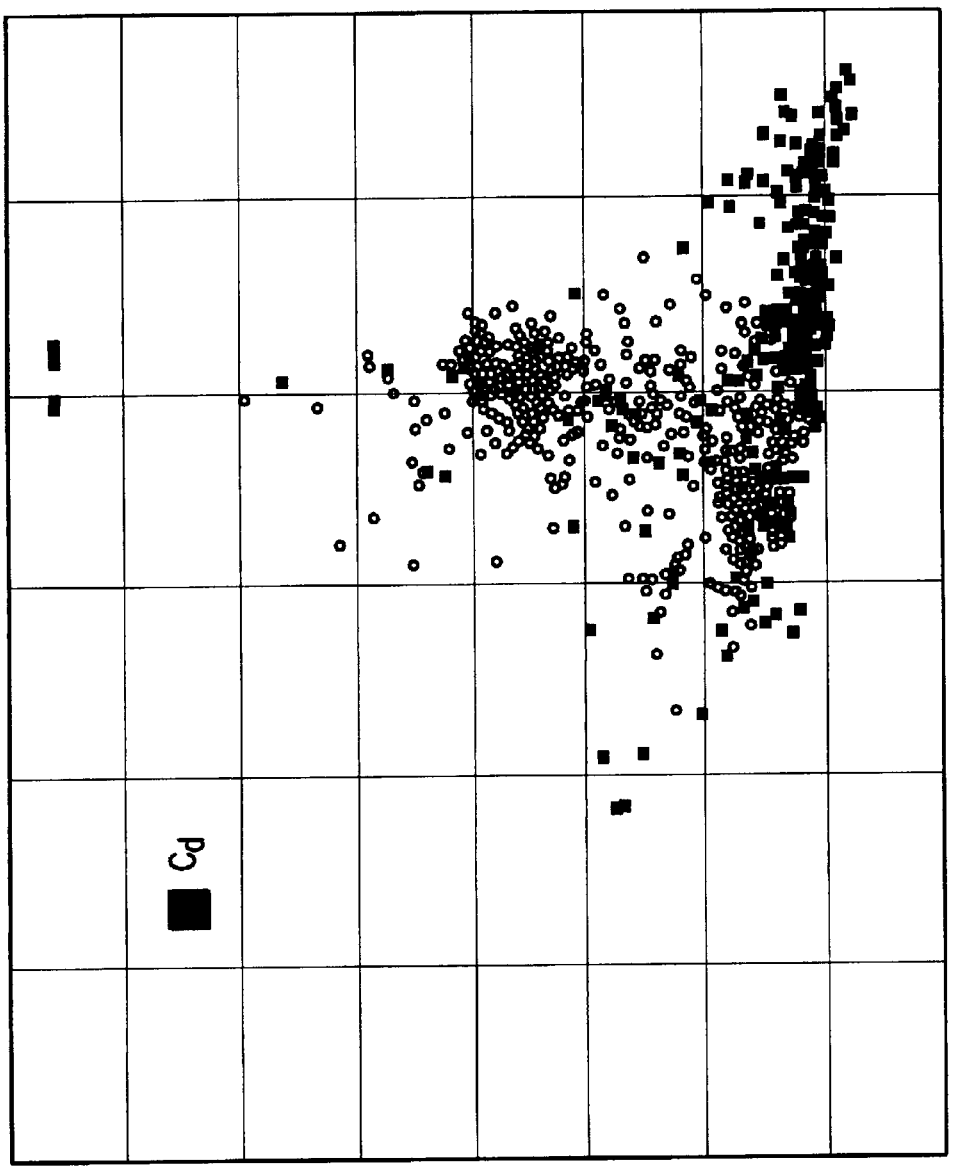

FIG. 7A represents a new learning set which has three dimensions and pertains to the VSH, DT and ILD logs, the RHOB log having been removed. It is then found that a large number of points is accepted and assigned to the class $C_a$ (FIG. 7B), and that few points are considered as ambiguous (FIG. 7C) or rejected (FIG. 7D). The conclusion is that the RHOB log poses a problem and that this is probably due to a calibration error for the application well A, or the tool which was used for determining the RHOB log.

FIG. 4C represents the ST and MD for each three-dimensional set, the first representing the result after elimination of the RHOB log, while the last represents the result after elimination of the ILD log. It is found that the observations are all rejected when they pertain to clay or clay/shale facies. The inference from this is that this facies is not contained in the learning set.

The following Table (1) summarizes the various comments above.

TABLE 1

| STM WELL A | $C_a$ (%) | $C_o$ (%) | $C_d$ (%) |
|---|---|---|---|
| STM with 4 logs | 3.89 | 17.96 | 78.15 |
| STM without RHOB | 78.57 | 15.97 | 5.46 |
| STM without VSH | 31.93 | 25.84 | 42.23 |
| STM without DT | 24.89 | 43.80 | 31.31 |
| STM without Log ILD | 19.22 | 24.79 | 55.99 |

The assignment percentages for each class in Table (1) do indeed confirm that the results are much better when the RHOB log is not taken into account, and that this RHOB log has a significant influence in application well A on rejecting the majority of the points.

As regards application well B, FIGS. 5A to 5C and 8A to 9D represent the various results which are collated in Table 2 below.

TABLE 2

| STM WELL B | $C_a$ (%) | $C_o$ (%) | $C_d$ (%) |
|---|---|---|---|
| STM with 4 logs | 54.77 | 20.83 | 24.40 |
| STM without RHOB | 79.27 | 16.1O | 4.63 |
| STM without VSH | 79.56 | 15.24 | 5.20 |
| STM without DT | 75.60 | 18.03 | 6.37 |
| STM without Log ILD | 83.03 | 9.16 | 7.81 |

In FIG. 5B, analysing the MD and ST logs shows that some of the application observations which are considered as ambiguous correspond, according to the lithology log in FIG. 5A, to clay/silt or clay facies not contained in the learning set. In these facies, the prediction of the permeability is not reliable.

FIG. 5C shows that, whether it is the RHOB, VSH, DT or ILD log which is removed, the similarity increases significantly or is of the same order of magnitude.

Referring to the cross plots in FIGS. 8A to 8D, it can be seen that the majority of the observations for well B are similar to the data in the learning set and therefore assigned to the acceptance class $C_a$, with an acceptance percentage higher than 75% irrespective of the log removed, with a percentage for the ambiguity class $C_o$ lying between 9 and 18% and a percentage for the reject class $C_d$ lying between 4.63 and 7.81%. However, it should be noted that each time a log is eliminated, accuracy is lost in comparison with FIG. 5B which pertains to the membership degree of the four-log set. This is particularly the case when VSH is removed since the increase in the similarity degree MD would imply that the silt and clay facies are included in the learning set, while they are rejected by the other membership degrees. However, this is not the case when comparing the diagrams in FIGS. 8D and 9D, where it can be seen that there is actually rejection of a relatively large number of points, which rejection is confirmed by the MDs of the STM without RHOB, without DT and without ILD on which the clay/silt and clay facies are indeed excluded from the learning set and are consequently not assigned to the acceptance class $C_a$.

The method according to the invention, which is a similarity threshold method (STM) therefore makes it possible to grade the results of the permeability estimation and identify the silt and clay levels not included in the learning set.

The particular feature of the method according to the invention is that it is independent of the interpretation processes used and that it is very powerful for evaluating the coherence between several sets of data or observations.

Lastly, the method according to the present invention can be applied to numerous cases. It may be used:

upstream of a logging study, in order to evaluate the coherence of the data between several wells;

in the scope of an electro-facies characterization or for estimating continuous or discrete measurements;

for evaluating the representative character of a zone core-sampled on several wells;

in a more geological context, for characterizing from logging viewpoint, of the facies or environments described on the core samples.

What is claimed is:

1. Method of characterizing the coherence of measurements made in a given medium, comprising the steps of:

taking N types of reference measurements at each point ($P_i$) of a given reference set of said medium, each point ($P_i$) being defined by a depth dimension, the group of N measurements which are associated with each point ($P_i$) constituting a reference observation ($X_i$), forming at least one N-dimensional learning set containing all the points ($P_i$), taking at least N application measurements at each point ($Q_i$) of an application set of the medium, which is different from the reference set, each group of application measurements which are associated with the point ($Q_i$) constituting an application observation (x), comparing each application observation (x) with all the reference observations ($X_i$) of the learning set, constructing a neighbourhood domain ($D_i$) for each reference observation ($X_i$) of the learning set using the k nearest neighbours process (K-NN), said neighbourhood domains constituting the learning set which defines an acceptance class ($C_a$) for application observations (x) in the application set, and defining a degree of membership of the application observations (x) to the acceptance class ($C_a$), each application observation (x) being assigned to the acceptance class ($C_a$) when its membership degree is at least greater than a first threshold ($S_1$).

2. Method according to claim 1, wherein each application observation (x) is assigned to one of three classes consisting of the acceptance class ($C_a$), an ambiguity class ($C_o$), or a reject class ($C_d$).

3. Method according to claim 2, wherein an application datum (x) is assigned to the ambiguity class when its membership degree lies between $S_1$ and $S_2$.

4. Method according to claim 1, wherein the membership degree comprises at least two thresholds ($S_1$, $S_2$), the second threshold being less than the first threshold ($S_1$).

5. Method according to claim 4, wherein an application observation (x) is assigned to the reject class ($C_d$) when its membership degree is less than the second threshold ($S_2$).

6. Method according to claim 4, characterized in that an application datum (x) is assigned to the ambiguity class when its membership degree lies between $S_1$ and $S_2$.

7. Method according to claim 1, wherein the membership degree is defined by a membership function:

$$\mu_i(x) = e^{\left[-\frac{x-X_i}{\sigma_i}\right]} \quad (1)$$

in which $X_i$ is an observation in the learning set, i lying between 1 and $n_a$, $n_a$ corresponds to the number of reference observations in the learning set, $\sigma_i$ is the radius of the domain centred on the observation $X_i$, x is an application observation in the application set.

8. Method according to claim 7, wherein the membership degree $\mu(x)$ corresponds to the mean of the k' strongest memberships $\mu_i(x)$ to the domains $D_i$ in the learning set.

9. Method according to claim 8, wherein the mean k' lies between 1 and k.

10. Method according to claim 9, wherein the value of k' is very much greater than 1.

11. Method according to claim 1, wherein, in order to clarify an ambiguity attached to an application observation (x), an (n−1)-dimensional learning set is constructed, the dimension removed corresponding to one type of measurements.

* * * * *